(12) United States Patent
Hofer

(10) Patent No.: US 7,466,356 B2
(45) Date of Patent: Dec. 16, 2008

(54) METHOD AND APPARATUS FOR SETTING A MARKER ON AN OBJECT AND TRACKING THE POSITION OF THE OBJECT

(75) Inventor: Gregory V. Hofer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 991 days.

(21) Appl. No.: 10/627,889

(22) Filed: Jul. 25, 2003

(65) Prior Publication Data

US 2005/0018066 A1 Jan. 27, 2005

(51) Int. Cl.
*H04N 5/222* (2006.01)
*H04N 5/232* (2006.01)
*H04N 5/228* (2006.01)
*H04N 5/225* (2006.01)
*G06K 9/00* (2006.01)

(52) U.S. Cl. .................. 348/333.02; 348/345; 348/169; 348/208.14; 382/103

(58) Field of Classification Search ............ 348/208.14, 348/333.02, 345, 169; 382/103, 118
See application file for complete search history.

(56) References Cited

U.S. PATENT DOCUMENTS

| 5,187,585 | A | | 2/1993 | Kaneda et al. | |
|---|---|---|---|---|---|
| 5,204,749 | A | * | 4/1993 | Toyama et al. | 348/169 |
| 5,473,369 | A | | 12/1995 | Abe | |
| 5,627,586 | A | * | 5/1997 | Yamasaki | 348/208.14 |
| 5,631,697 | A | * | 5/1997 | Nishimura et al. | 348/172 |
| 5,644,139 | A | | 7/1997 | Allen et al. | |
| 5,739,857 | A | * | 4/1998 | Kaneda | 348/349 |
| 5,808,678 | A | * | 9/1998 | Sakaegi | 348/350 |
| 6,226,388 | B1 | * | 5/2001 | Qian et al. | 382/103 |
| 6,462,773 | B1 | | 10/2002 | Koga | |
| 7,133,537 | B1 | * | 11/2006 | Reid | 348/169 |
| 2003/0071908 | A1 | * | 4/2003 | Sannoh et al. | 348/345 |

FOREIGN PATENT DOCUMENTS

JP 61046920 A 3/1986

OTHER PUBLICATIONS

HP Pending Application 200208327-1, Hofer, Gregory V., A Method And Apparatus For Controlling The Depth Of Field Using Multiple User Interface Markers, U.S. Appl. No. 10/406,767, filed Apr. 2, 2003, 16 pages.
HP Pending Application 10982103-1, Silverstein, D. Amnon, Pointing Device For Digital Camera Display, U.S. Appl. No. 09/484,667, filed Jan. 18, 2000, 27 pages.

* cited by examiner

*Primary Examiner*—Nhan T Tran

(57) ABSTRACT

A digital imaging system that allows the user to select and mark objects with markers is disclosed. The digital imaging device tracks the position of the marked objects even when the marked objects are not in the field of view of the digital imaging system.

22 Claims, 3 Drawing Sheets

METHOD AND APPARATUS FOR SETTING A MARKER ON AN OBJECT AND TRACKING THE POSITION OF THE OBJECT

FIELD OF THE INVENTION

The field of this invention relates to digital imaging devices.

BACKGROUND OF THE INVENTION

Digital imaging devices typically have many automatic settings. For example, many digital cameras automatically set the focus, the aperture, and the exposure time. Some digital cameras allow the user to override or assist the automatic settings. For example, some digital cameras allow the user to set the area in the image that will be used by the camera to determine the focus. One way this is done is by centering the area in the viewfinder and pressing the shutter button halfway down. Once the camera has focused, the user re-frames the shot and presses the shutter button the rest of the way down. Other cameras allow the user to mark an object to be used as the focus area, for example see U.S. Pat. No. 5,187,585 "Image sensing apparatus with settable focus detection area" which is hereby included by reference. One way that is used to select an object is for the user to center the object in the viewfinder or display and then press a control. Once an object has been selected a marker is displayed that identifies the object. There are many styles used for markers, one example is square brackets that is shown surrounding the selected object. Some cameras even allow multiple objects to be selected and marked. In many cameras today the camera tracks the selected object even when the camera is panned to reframe the scene. Unfortunately, cameras today lose track of a selected object when the camera is panned far enough that the object is no longer in the field of view of the device.

Therefore there is a need for a digital imaging device that can track the position of selected objects even when the selected objects are not currently in the field of view of the camera.

SUMMARY OF THE INVENTION

A digital imaging system that allows the user to select and mark objects with markers is disclosed. The digital imaging device tracks the position of the marked objects even when the marked objects are not in the field of view of the digital imaging system.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
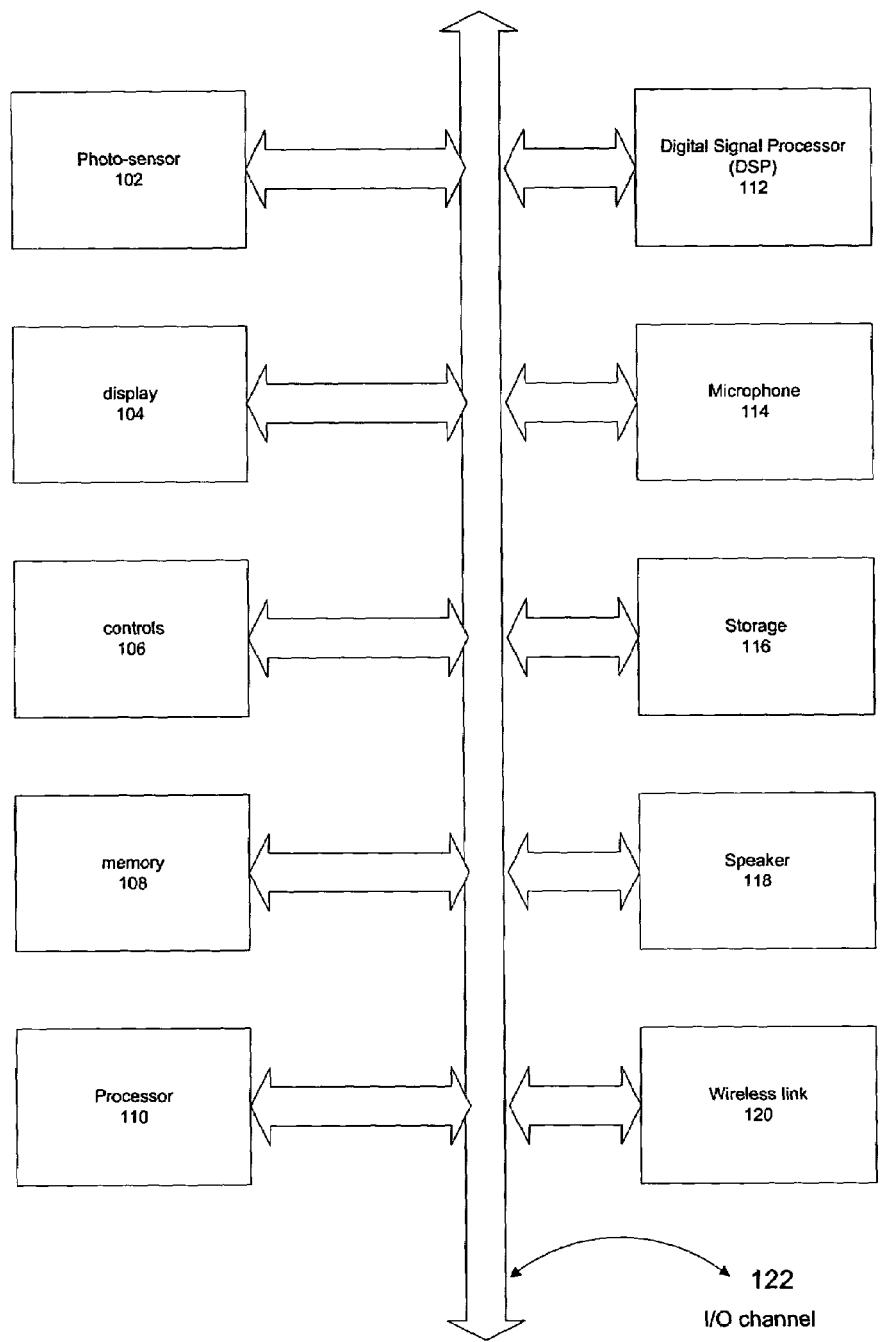
FIG. 1 is a block diagram of a digital imaging system that could implement an example embodiment of the present invention.
Figure 2:
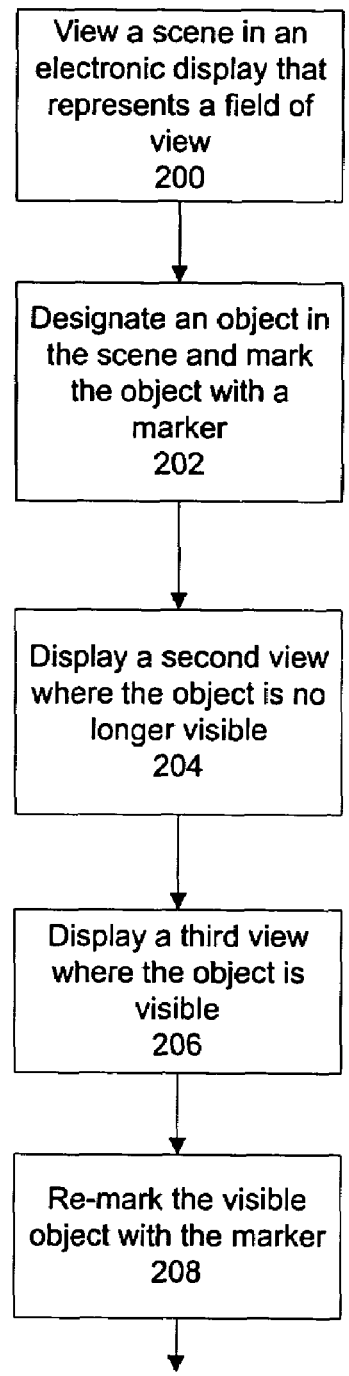
FIG. 2 is a flow chart for marking and then tracking an object in the scene in accordance with an example embodiment of the present invention.

An electronic block diagram of a typical digital imaging device is shown in FIG. 1. Digital cameras today typically contain a photo-sensor (102) for capturing images; a display area (104) for displaying the captured images and controlling the digital camera; a storage area (116) for storing the captured images; memory (108), for temporary manipulation of the captured images and for running the firmware of the camera; a processor (110) for controlling the camera, and some type of controls (106). Some digital cameras also include a microphone (114) for capturing audio clips along with the digital images. Some digital cameras include a speaker (118) and a digital signal processor (DSP 112). The controls (106) on digital cameras may include physical controls like buttons, rocker switches, and a keyboard, and virtual controls shown in the display area. The digital images, video clips and audio clips captured by the digital camera may be stored in memory (108) or may be moved to the storage area (116). Today the memory and the storage area are typically different types of devices. The memory is typically fast volatile memory and the storage area is typically slower non-volatile memory. In the future, as the speed of non-volatile memory increases, all the memory may be of the non-volatile type. Digital imaging devices typically have an input/output (I/O) channel (122). This I/O channel may be, for example, a USB bus, a SCSI bus, an IR link, Fire Wire, or a parallel link. The I/O channel is used to connect the digital imaging device to other computer systems or networks. Some digital imaging devices connect to other computer systems using a camera dock. Digital cameras may also contain a wireless link (120) to the Internet, for example a cell phone.

Some digital cameras have more than one display area, for example a camera may have an LCD display on the back of the camera and have a micro display used as a viewfinder. Both the LCD and the micro display can be used to display a real time view of the scene viewed by the camera. This also allows the camera to display additional information in the displays as the user frames the picture. One type of information that may be displayed is a marker to show where, in the field of view, the camera is focusing. Some cameras allow the user to set or pick an object to use for focusing, for example see U.S. Pat. No. 5,187,585 "Image sensing apparatus with settable focus detection area". In the 585 patent, an object can be designated, and the camera will use that object as the area to focus on, even if the object is moving. There are a number of well-known methods to designate an object. One way is to center the object in the viewfinder and then activate a control. Some cameras use the S1 position of the shutter button as the control (Typically, the S1 position is when the shutter button has been pressed half way down). Other cameras have controls that are different than the shutter button.

Once an object has been designated, some cameras mark that object in the display area using a marker. There are many types of markers that can be used, for example square brackets can be shown surrounding the designated object. When the camera is moved to reframe the scene, the marker stays centered on the designated object. In this way, the designated object is tracked as its position shifts in the field of view.

There are many ways to track objects in a scene. One way to track objects is disclosed in U.S. Pat. No. 5,187,585 "Image sensing apparatus with settable focus detection area". In the 585 patent, an object detection module determines the image characteristics of designated objects. It then uses these image characteristics to track the position of the object, even when the object is in motion. Another way to track the position of objects is disclosed in the application "Pointing device for digital camera display", Ser. No. 09/484,667 filed Jan. 18, 2000, hereby incorporated by reference for all that it teaches. The 667 application teaches taking multiple exposures, or frames, of a scene, in quick secession. The device then compares changes between subsequent images to calculate an amount and a direction of change for the motion of the device. Using the calculated motion of the device, the relative position of objects in the scene can be determined. For example, the device would use the first image or two to establish a frame of reference. By tracking the subsequent motion of the device compared to the initial frame of reference, the direction the device is currently pointing can be determined. Using the current pointing direction and the initial frame of reference, object positions can be tracked. With a known object position inside the frame of reference, the object can be marked with a marker whenever the object position is within the field of view of the device.

In one example embodiment of the current invention, a scene would be viewed in an electronic display (200). An object in the scene would be designated and marked with a marker (202). A second view of the scene would be displayed, where the object is no longer visible (204). A third view of the scene would be displayed, where the object is visible (206). The object would be remarked with the marker in the third view (208). In one example embodiment, the device would track the position of the object as the field of view of the device changed. In another example embodiment, the device would track the position of the object as the object moved. In another example embodiment of the current invention, additional objects could be marked and tracked.

Figure 3:
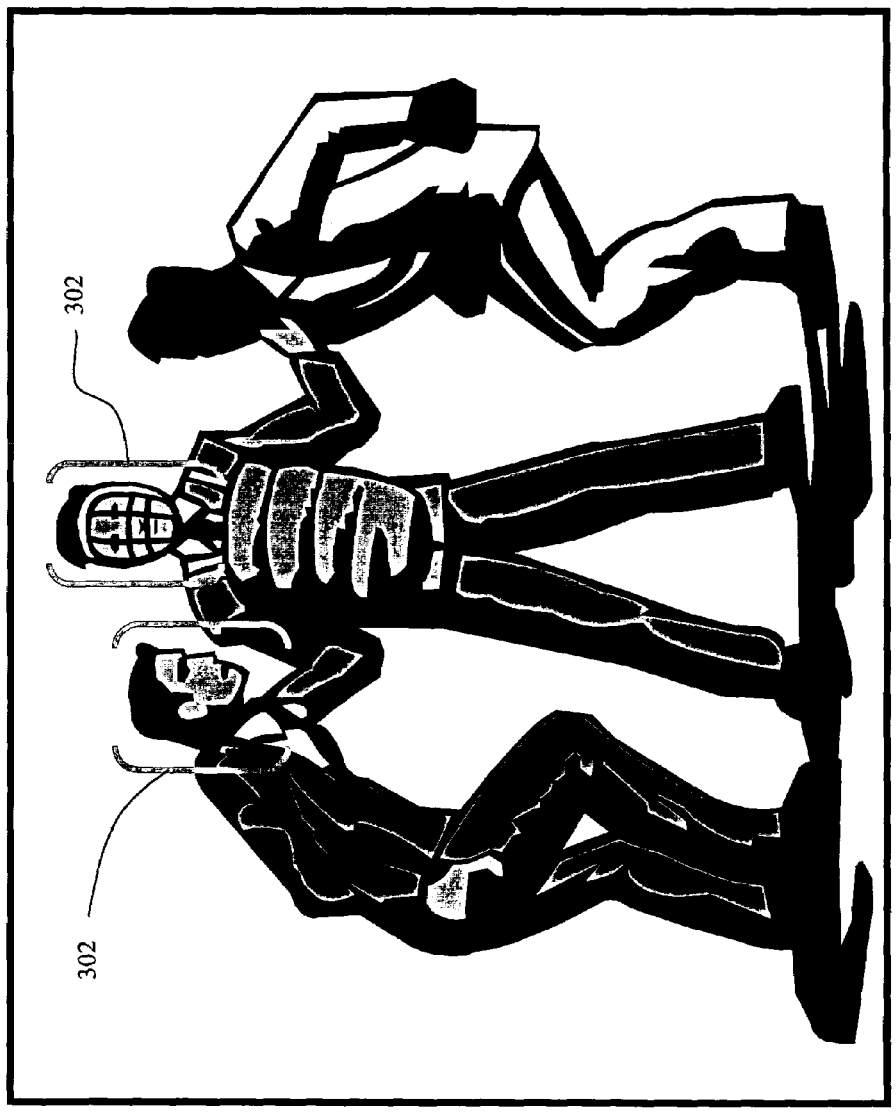
FIG. 3 is a view of a scene with two objects marked with markers in an example embodiment of the present invention.

FIG. 3 shows an example embodiment for markers (302) marking two objects in a scene.

In one example embodiment of the current invention, a digital device would image a view of a scene onto a photosensor (102). The digital device would display the view of the scene on a display (104). The digital device would contain at least one control (106) allowing user input into the digital device. The digital device would contain a processor (10) configured to monitor the control (106). The processor (110 or 112) would be configured to establish an initial frame of reference when detecting user input from the control (106). The initial frame of reference would be established by reading the view of the scene from the photo sensor (102). The processor (110 or 112) would be configured to display markers in the display (104) at a predetermined location with respect to the initial frame of reference. For example, the markers could be located in the center of the field of view of the device when the initial frame of reference is established. The processor (110 or 112) would be configured to compare multiple sequential views of the scene, captured by the photo sensor (102), to track the movement of the device with respect to the initial frame of reference. Using this information the processor (110 or 112) would be configured to display the marker when the predetermined location is within the field of view of the device.

In one example embodiment, a marker is positioned over a viewed (and captured) image (e.g., in the center of the display) and X and Y coordinates of this position are recorded. As subsequent images are captured during the tracking process, correlation computations are performed by the device to determine the change in direction and distance of the current captured image verses the previously captured image. Once the direction and distance of movement between the images are known, a new marker having different X and Y coordinates is determined. This new coordinate value is the new location of the original object in the current image. The object marker is then moved to the new coordinate position.

The above-described process continues as to each new image captured during tracking. The resulting effect is that the marker tracks the original object of the image in which it was positioned. Even if the marker, and therefore the object, "moves" off of the display, the object's X and Y coordinates can still be tracked in that new objects are identified and tracked in the same manner. In other words, relationships (e.g., distance and direction) between tracked objects are known and therefore may be used such that a scene several screens-widths away from the current viewed scene can still be tracked as the camera is panned. When an object that moved off the screen comes back into the live-view image area, its marker can then be re-enabled over the object.

In one example embodiment of the current invention, a digital device would image a view of a scene onto a photosensor (102). The digital device would display the view of the scene on a display (104). The digital device would contain at least one control (106) allowing user input into the digital device. The digital device would contain a processor (110) configured to monitor the control (106). The processor (110 or 112) would be configured to enable an object detection module when detecting user input from the control (106). The processor (110 or 112) would be configured to display markers in the display (104) indicating the object detected. The processor (110 or 112) would be configured to track the object across multiple views of the scene, captured by the photo sensor (102).

The foregoing description of the present invention has been presented for purposes of illustration and description. It is not intended to be exhaustive or to limit the invention to the precise form disclosed, and other modifications and variations may be possible in light of the above teachings. This invention is not limited to marking object to help focus a digital device, this invention can be used to mark other useful objects, for example but not limited to, light sources, areas of interest, and flash points. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
   displaying a first view of a scene;
   marking an object, displayed in the scene, with a marker;
   recording coordinates of the object in the first view of the scene;
   displaying a second view of the scene where the object is no longer visible, wherein the second view of the scene is subsequent to the first view of the scene;
   displaying a third view of the scene where the object is visible, wherein the third view of the scene is subsequent to the second view of the scene;
   remarking the displayed object with the marker in the third view;
   performing a correlation computation directly between the coordinates of the object in the first view of the scene and coordinates of the object in the third view of the scene to make a determination of a change in direction and/or distance relationships of the object in the third view of the scene relative to the first view of the scene; and
   using the distance and/or direction relationships to track the object in the first, second and third views that are screens-widths away from each other as the first view is panned to the second and third views.

2. The method of claim 1 where the object is no longer visible in the second view due to a change in the field of view of a device as the object between the first view of the scene and the second view of the scene.

3. The method of claim 1 where the object is no longer visible in the second view due to a movement of the object between the first view of the scene and the second view of the scene.

4. The method of claim 1 where a position of a second object is marked in the second view of the scene with a second marker, and the second marker is displayed when the second object is visible in a displayed view of the scene.

5. The method of claim 1 where the method is used in a digital camera.

6. The method of claim 1 where the marker is displayed as a set of square brackets that enclose the marked object.

7. The method of claim 1 where the scene is displayed on a viewfinder in a camera.

8. The method of claim 1 where the scene is displayed on a display on the back of a camera.

9. The method of claim 1 where the object is marked by centering the object in the display, and then activating a control.

10. The method of claim 1 further comprising:
displaying a fourth view of the scene where the object is visible;
remarking the displayed object with the marker in the fourth view;
performing a correlation computation directly between the coordinates of the object in the third view of the scene and coordinates of the object in the fourth view of the scene to make a determination of a change in direction and/or distance of the object in the fourth view of the scene relative to the third view of the scene.

11. A method comprising:
(a) taking a first frame of a scene representing a first field of view of a digital device;
(b) taking a second frame of the scene representing a second field of view of the digital device where the object is no longer visible, wherein the second frame of the scene representing the second field of view of the digital device is subsequent to the first frame of the scene representing the first field of view of the digital device;
(c) taking a third frame of the scene representing a third field of view of the digital device, wherein the third frame of the scene representing the third field of view of the digital device is subsequent to the second frame of the scene representing the second field of view of the digital device;
(d) comparing the first frame and the third frame and generating a first displacement value representative of a difference between the first frame and the third frame;
(e) processing data based on the first displacement value to determine the relative change between the first field of view and the third field of view;
(f) displaying the first field of view of the scene;
(g) marking an object displayed in the first field of the digital device for the first frame of view of the scene with a marker;
(h) displaying the second field of view of the digital device for the second frame of the scene where the object is no longer visible;
(i) tracking the position of the object relative to the first field of view and marking the object with a marker, in the display, when the object is visible in the third field of view;
wherein the (i) tracking the position of the object comprises performing a correlation computation directly between coordinates of the object in the first field of view and coordinates of the object in the third field of view when the object is visible in the third field of view, to make a determination of a change in direction and/or distance relationships of the object in the third field of view relative to the first field of view; and
wherein the distance and/or direction relationships is used to track the object in the first, second and third views that are screens-widths away from each other as the first view is panned to the second and third views.

12. The method of claim 11 further comprising:
(j) taking another frame of the scene representing a current field of view of the digital device;
(k) comparing the current frame with a previous frame and generating a current displacement value representative of a difference between the previous frame and the current frame;
(l) processing data based on the current displacement value to determine the relative change between the previous field of view and the current field of view;
(m) displaying the current field of view;
(n) tracking the position of the object relative to the previous field of view and marking the object with a marker, in the display, when the object is visible in the current field of view;
wherein the (n) tracking the position of the object comprises performing a correlation computation directly between coordinates of the object in the previous field of view and coordinates of the object in the current field of view when the object is visible in the current field of view, to make a determination of a change in direction and/or distance of the object in the current field of view relative to the previous field of view.

13. The method of claim 12, further comprising: repeating steps (j) through (n).

14. The method of claim 11 further comprising: displaying the marker as a set of square brackets that enclose the marked object.

15. The method of claim 11 further comprising: displaying the scene on a viewfinder in a camera.

16. The method of claim 11 further comprising: displaying the scene on a display on the back of a camera.

17. A digital imaging device, comprising:
an image sensor;
a lens configured to focus a first view of a scene onto the image sensor;
a display configured to display the first view of the scene;
a processor configured to mark an object in the disprayed first view of the scene;
the display configured to display a second view of the scene where the object is no longer visible, wherein the second view of the scene is subsequent to the first view of the scene;
the display configured to display a third view of the scene where the object is visible, wherein the third view of the scene is subsequent to the second view of the scene;
the processor configured to remark the object in the displayed third view with a marker;
the processor configured to perform a correlation computation directly between coordinates of the object in the first view of the scene and coordinates of the object in the third view of the scene to make a determination of a change in direction and/or distance relationships of the object in the third view of the scene relative to the first view of the scene; and the processor configured to use the distance and/or direction relationships to track the object in the first, second and third views that are screens-widths away from each other as the first view is panned to the second and third views.

18. The digital imaging device of claim 17 where the object is no longer visible in the second view of the scene due to a change in the field of view of the digital imaging device.

19. The digital imaging device of claim 17 where the object is no longer visible in the second view of the scene due to a movement of the object.

20. A digital imaging device, comprising:
an image sensor;
a lens configured to focus a scene, within a field of view, onto the image sensor;
a display configured to display the scene focused onto the image sensor;
a control configured to allow user input into the digital imaging device;
a processor configured to monitor the control;
the processor configured to establish an initial frame of reference when detecting user input from the control;
the processor configured to display a marker on the display at a predetermined location with respect to the initial frame of reference, wherein the predetermined location corresponds to an object;
the processor configured to compare multiple views of the scene, captured by the image sensor, to track the movement of the digital imaging device with respect to the initial frame of reference, through performance of a correlation computation directly between coordinates of the predetermined location in the initial frame of reference and coordinates of the predetermined location within the field of view to make a determination of a change in direction and/or distance relationships of the digital imaging device in the field of view relative to the initial frame of reference, whereby the marker is displayed when the predetermined location is within the field of view of the digital imaging device;
wherein the multiple views of the scene comprise first and third views of the scene where the object is visible;
the display configured to display the first view of the scene where the object is visible;
the processor configured to mark the object in the displayed first view of the scene with the marker;
the display configured to display a second view of the scene where the object is no longer visible, wherein the second view of the scene is subsequent to the first view of the scene;
the display configured to display the third view of the scene where the object is visible, wherein the third view of the scene is subsequent to the first view of the scene;
the processor configured to remark the object in the displayed third view with the marker; and
the processor configured to use the distance and/or direction relationships to track the object in the first, second and third views that are screens-widths away from each other as the first view is panned to the second and third views.

21. A digital imaging device comprising:
a means for capturing an image of a scene, the image defined by a field of view of the digital imaging device;
a means for displaying the image of the scene;
a means for marking an object displayed in the scene;
a means for establishing an initial frame of reference defined by a user-selected field of view through employment of recordation of coordinates of the object in the initial frame of reference;
a means for comparing multiple fields of views to track a movement of the object and determine the position of the current field of view with respect to the initial frame of reference whereby the object is marked when the object is within the displayed field of view;
wherein the means for comparing multiple fields of views comprises means for performing a correlation computation directly between the coordinates of the object in the initial frame of reference and coordinates of the object in the current field of view to make a determination of a change in direction and/or distance relationships of the object in the current field of view relative to the initial frame of reference;
wherein the multiple fields of views comprises first and third fields of views where the object is visible;
the means for displaying the image of the scene configured to display the first field of view where the object is visible;
the means for marking the object displayed in the scene configured to mark the object in the displayed first field of view;
the means for displaying the image of the scene configured to display a second field of view where the object is no longer visible, wherein the second field of view is subsequent to the first field of view;
the display configured to display the third view where the object is visible,
wherein the third field of view is subsequent to the second field of view;
the means for marking the object displayed in the scene configured to mark the object in the displayed third field of view; and
wherein the distance and/or direction relationships is used to track the object in the first, second and third views that are screens-widths away from each other as the first view is panned to the second and third views.

22. The digital imaging device of claim 21 further comprising:
a means for establishing an updated frame of reference through employment of recordation of coordinates of the object in the current field of view;
wherein the means for comparing multiple fields of views comprises means for performing a correlation computation directly between the coordinates of the object in the updated frame of reference and coordinates of the object in a subsequent field of view to make a determination of a change in direction and/or distance of the object in subsequent field of view relative to the updated frame of reference.

* * * * *

UNITED STATES PATENT AND TRADEMARK OFFICE
CERTIFICATE OF CORRECTION

PATENT NO.            : 7,466,356 B2                                      Page 1 of 1
APPLICATION NO. : 10/627889
DATED                 : December 16, 2008
INVENTOR(S)           : Gregory V. Hofer It is certified that error appears in the above-identified patent and that said Letters Patent is hereby corrected as shown below:

In column 3, line 40, delete "(10)" and insert -- (110) --, therefor.

In column 6, line 54, in Claim 17, delete "disprayed" and insert -- displayed --, therefor.

Signed and Sealed this

Second Day of June, 2009

JOHN DOLL
*Acting Director of the United States Patent and Trademark Office*